(12) United States Patent
Shaffer et al.

(10) Patent No.: US 8,406,998 B2
(45) Date of Patent: Mar. 26, 2013

(54) TRAFFIC PREDICTIVE DIRECTIONS

(75) Inventors: Shmuel Shaffer, Palo Alto, CA (US);
Ramanathan T. Jagadeesan, San Jose, CA (US); Bich Tu Nguyen, Los Altos, CA (US); Gregory D. Pelton, Raleigh, NC (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1070 days.

(21) Appl. No.: 12/030,026

(22) Filed: Feb. 12, 2008

(65) Prior Publication Data

US 2009/0204320 A1   Aug. 13, 2009

(51) Int. Cl.
*G01C 21/34* (2006.01)
(52) U.S. Cl. ....................................... 701/414; 701/416
(58) Field of Classification Search .................. 701/414, 701/416
See application file for complete search history.

(56) References Cited

U.S. PATENT DOCUMENTS

| | | | | |
|---|---|---|---|---|
| 5,955,974 A * | 9/1999 | Togawa | ......................... | 340/994 |
| 6,026,375 A * | 2/2000 | Hall et al. | .................. | 705/26.43 |
| 6,163,751 A * | 12/2000 | Van Roekel | .................. | 701/414 |
| 6,317,686 B1 * | 11/2001 | Ran | ................ | 701/210 |
| 6,401,027 B1 * | 6/2002 | Xu et al. | ....................... | 701/117 |
| 6,510,384 B2 * | 1/2003 | Okano | ......................... | 701/209 |
| 6,622,087 B2 * | 9/2003 | Anderson | ..................... | 701/209 |
| 6,691,026 B2 | 2/2004 | Odinak et al. | ................ | 701/202 |
| 6,708,107 B2 * | 3/2004 | Impson et al. | ................ | 701/117 |
| 7,027,915 B2 * | 4/2006 | Craine | ......................... | 701/117 |
| 7,050,903 B1 * | 5/2006 | Shutter et al. | ................ | 701/117 |
| 7,330,786 B2 | 2/2008 | Odinak et al. | ................ | 701/202 |
| 7,418,340 B2 * | 8/2008 | Kasai | ............................ | 701/209 |
| 7,739,040 B2 * | 6/2010 | Horvitz | ......................... | 701/210 |
| 7,813,870 B2 * | 10/2010 | Downs et al. | ................. | 701/117 |
| 7,869,936 B2 * | 1/2011 | Donatelli et al. | ............. | 701/118 |
| 8,024,111 B1 * | 9/2011 | Meadows et al. | ............. | 701/414 |
| 2002/0082772 A1 * | 6/2002 | Okano | ......................... | 701/209 |
| 2002/0128773 A1 * | 9/2002 | Chowanic et al. | ............ | 701/210 |
| 2004/0102896 A1 * | 5/2004 | Thayer et al. | ................ | 701/207 |
| 2005/0222762 A1 * | 10/2005 | Hamilton et al. | ............. | 701/210 |
| 2005/0251324 A1 * | 11/2005 | Wiener et al. | ................ | 701/200 |
| 2006/0025925 A1 * | 2/2006 | Fushiki et al. | ................ | 701/210 |
| 2007/0013551 A1 * | 1/2007 | Gueziec | ......................... | 340/905 |
| 2007/0208492 A1 * | 9/2007 | Downs et al. | ................. | 701/117 |

OTHER PUBLICATIONS

Garmin's MSN Direct Traffic Service, found at http://www8.garmin.com/traffic/msn/index.jsp2/12/2008, one page, Feb. 12, 2008.
Garmin's Traffic Services, found at http://www8.garmin.com/traffic2/12/2008, one page, Feb. 12, 2008.
Tom Tom's Traffic Service, found at http://www.tomtom.com/page.php?page=rds-tmc2/12/2008, two pages, Feb. 12, 2008.

(Continued)

*Primary Examiner* — Mark Hellner
*Assistant Examiner* — Ari M Diacou
(74) *Attorney, Agent, or Firm* — Baker Botts L.L.P.

(57) ABSTRACT

A method includes receiving a request to determine a route between a starting location and a destination location. The method also includes determining a first route between the starting location and the destination location using predictive traffic data for at least one location between the starting location and the destination location. The method further includes providing the first route.

26 Claims, 3 Drawing Sheets

OTHER PUBLICATIONS

Tom Tom's Plus Services, found at http://www.tomtom.com/plus/service.php?ID=3&Lid=4 2/12/2208, three pages, Feb. 12, 2008.
Tom Tom's GO 920 T Product features, found at http:/www.tomtom.com/products/features.php?ID=423&Category=0&Lid=4 Feb. 12, 2008, six pages.
Garmin's FM TMC Traffic Service found at http://www8.garmin.com/traffic/fm/index.jsp2/12/2008, three pages, Feb. 12, 2008.
Garmin's XM Traffic Service found at http://www8.garmin.com/xm/index.jsp2/12/2008, three pages, Feb. 12, 2008.

* cited by examiner

(12) United States Patent
US 8,406,998 B2

TRAFFIC PREDICTIVE DIRECTIONS

TECHNICAL FIELD OF THIS DISCLOSURE

The present disclosure relates generally to traffic predictive directions.

BACKGROUND

Devices and programs exist that provide users with directions between known locations. For example, the user may use one of these devices to get directions from her office to a friend's house that she has not previously visited. The user may be able to select the types of roads she prefers (e.g., I prefer highways but would like to avoid toll roads). In addition the device providing the direction has its own internal metrics that associate a particular cost with particular roads. For example, a side street may have a higher cost than a freeway, or a road with a speed limit of 50 MPH may have a lower cost than a road with a speed limit of 20 MPH. Some online programs may even take into account the current traffic conditions. For example, if the program knows that there is currently traffic on a particular freeway, it may provide directions that avoid the congested area.

BRIEF DESCRIPTION OF THE DRAWINGS

To provide a more complete understanding of the features and advantages of particular embodiments, reference is made to the following description, taken in conjunction with the accompanying drawings, in which.

DESCRIPTION OF EXAMPLE EMBODIMENTS

Overview

In accordance with particular embodiments, a method includes receiving a request to determine a route between a starting location and a destination location. The method also includes determining a first route between the starting location and the destination location using predictive traffic data for at least one location between the starting location and the destination location. The method further includes providing the first route.

Description

Figure 1:
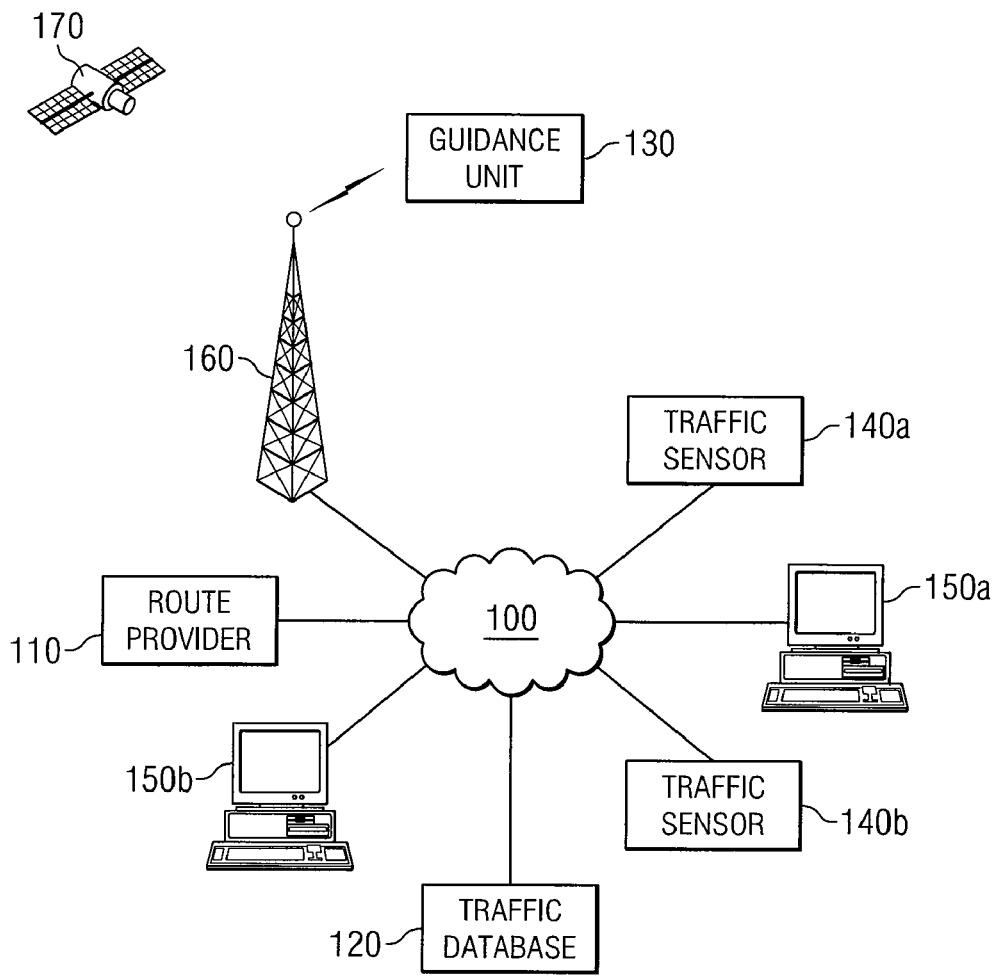
FIG. 1 is a block diagram illustrating a network comprising a plurality of components that may be used to facilitate traffic predictive directions, in accordance with a particular embodiment.

FIG. 1 is a block diagram illustrating a network comprising a plurality of components that may be used to facilitate traffic predictive directions, in accordance with a particular embodiment. Network 100 couples together various components that may collect, distribute and/or process traffic data to provide a user with traffic predictive directions. More specifically, network 100 may allow route provider 110 to access traffic information and data from traffic database 120, traffic sensors 140, and/or computers 150. Route provider 110 may use this information to generate a route for a user that takes into account the predicted traffic conditions at a particular time and location based on its estimation of when the user will be traveling through that particular location. Network 100 may also provide a mechanism for distributing the route determined by route provider 110 to the user. For example, the user may be presented with the determined route via guidance unit 130 or computer 150. Furthermore, because these components are interconnected via network 100, it may be possible to update or alter the route after it has been distributed. For example, if there is an accident along a route after the user has started on his trip, route provider 110 may be able to generate an alternate route and send it to, for example, guidance unit 130 via transmission tower 160.

While a common application of route provider 110 may be for driving directions, it may also be used for any other type of transportation, such as by boat, plane, skis, or on foot. Accordingly, the term "route", "traffic", and "directions" should not be interpreted as only applying to driving directions along paved streets.

Route provider 110 may comprise any suitable combination of hardware, software and/or encoded logic operable to collect and manipulate predictive, current and/or past traffic data to generate directions from one location to the next. Predictive traffic data may include data that indicates what the expected traffic will be at a particular location at a particular time. In some embodiments, route provider 110 may receive predictive traffic data from another component, such as traffic database 120. For example, route provider 110 may receive predictive traffic data indicating that between 5:00 p.m. and 7:00 p.m. a particular freeway will become congested. In particular embodiments, route provider 110 may receive current and/or past traffic data that it may use to determine the predictive traffic data. For example, route provider 110 may receive current and/or past traffic data that indicates that previously between 5:00 p.m. and 7:00 p.m. a particular freeway usually is congested. Using this data, route provider 110 may determine that today between 5:00 p.m. and 7:00 p.m. the freeway will be congested.

In generating the directions route provider 110 may use one or more different metrics that may take into account several different factors, such as the type of road, the terrain, the speed limit, actual traffic conditions, predicted traffic conditions, start time, and/or any other conditions or factors that may be desired. The predicted traffic conditions may be based on the expected traffic at a particular location at a particular time (e.g., the traffic at an intersection at the user's estimated time of arrival at the intersection), as opposed to the actual traffic at the location when the route is determined. For example, if in the morning route provider 110 is generating directions from point A to point B for a trip in the afternoon, route provider 110 may use the predicted traffic conditions during the afternoon as opposed to the current traffic conditions in the morning. As another example, if route provider 110 is generating directions from point A to point B it may take into account the fact that time advances as the user proceeds along the route. More specifically, when determining the route from point A to point B, route provider 110 may use the predicted traffic conditions at several different time points based on an estimated time of arrival. As may be apparent, this may provide the user with a much more accurate estimate of travel time and may help users to avoid congested areas.

In determining the predicted traffic conditions, route provider 110 may apply a learning algorithm to prior traffic data stored in, for example, traffic database 120. This may help route provider 110 to more accurately predict what will be the effect of special events (e.g., a sporting event or concert) or current traffic conditions. For example, if an accident occurs at a particular location, route provider 110 may monitor how quickly the accident impacts traffic in other locations and how far from the accident traffic is impacted. This information may be stored in traffic database 120. Route provider 110 may also employ load balancing algorithms to help route users away from congested areas. For example, if route provider has directed several users along the same road at the same time, it may send a subsequent number of users along an alternate road so as to avoid creating congestion on either of the roads.

In particular embodiments, traffic database 120 may store the routes provided for other users. Route provider 110 may then use these routes to determine and balance the traffic load on the various roads used for the routes stored in traffic database 120. By having access to these routes route provider 110 may be able to more accurately predict the traffic conditions of a particular road at a particular time. Thus, route provider 110 may be able to route a current user around a particular area if it determines that there are already several users that will be traveling in that area when the current user reaches that area.

Traffic database 120 may comprise any suitable combination of hardware, software and/or encoded logic operable to store and/or organize traffic data. The traffic data stored by traffic database 120 may include a wide variety of information. For example, for a particular data sample traffic database 120 may store data indicative of the corresponding location of the data sample, what time the sample was taken (e.g., second, minute, hour, day, date, week, month, year, etc.), whether there was any nearby events (e.g., sporting event, conference or concert), whether there were any nearby accidents (e.g., near in time and/or location), or any other desired information that may provide insight to help predict future traffic conditions. This information may be used to track recurring traffic conditions, such as the traffic during rush hour, and to monitor reactive traffic conditions, such as the traffic after an event (e.g., an accident, a game, a concert, a convention, or any other large gathering). Traffic database 120 may also store predicted traffic data calculated by route provider 110.

Guidance unit 130 may comprise any suitable combination of hardware, software and/or encoded logic operable to provide directions to a user. In some embodiments this may include turn-by-turn directions in which the user is alerted to an upcoming turn shortly before he is to make the turn. To facilitate this functionality, guidance unit 130 may include Global Positioning System (GPS) capabilities that may identify the position of guidance unit 130. The GPS information may be provided by satellite 170. In determining the route to be used, guidance unit 130 may take into account the predicted traffic along the route (and along other potential alternate routes) based on the time of day at which the user is expected to be at that location. The predicted traffic may be provided by route provider 110 or traffic database 120. In particular embodiments, guidance unit 130 may receive the predicted traffic wirelessly (e.g., transmission tower 160 may broadcast the data). In some embodiments, this may allow guidance unit 130 to receive updated traffic information as the user progresses along the route. This may allow guidance unit 130 to re-route the user around a congested area that recently became congested (e.g., an accident occurs after the user has started along the route) or is predicted to become congested before the user arrives. Depending on the embodiment, the predictive traffic information may, for example, be determined upon request (e.g., guidance unit 130 may first request predicted traffic along freeway X at 5:00 PM) or automatically (e.g., transmission tower 160 periodically transmits the predicted traffic for certain areas at certain times).

Traffic sensors 140 may comprise any suitable combination of hardware, software and/or encoded logic operable to provide data indicative of the current traffic conditions. For example, traffic sensor 140a may comprise a device operable to determine the traffic density (e.g., a switch located in the middle of the road that counts the number of cars that pass by within a specified period of time). As another example, traffic sensor 140b may comprise a device operable to determine the speed of cars that pass by (e.g., a radar gun aimed at a particular lane). Regardless of the manner in which traffic sensor 140 detects the traffic density or flow rate, the information gathered by traffic sensor 140 may be sent to route provider 110 and/or traffic database 120. The current traffic data may be used by route provider 110 to determine routes for users, and it may be archived by traffic database 120.

Computers 150 may comprise any suitable combination of hardware, software and/or encoded logic operable to provide various computer functionality. Such functionality may include, but is not limited to, providing a device through which a user may interact with route provider 110. More specifically, a user may use computer 150 to get directions from point A to point B based on the predicted traffic level along the route. The directions may be provided by route provider 110. Computers 150 may also be used to update, study, manipulate or otherwise interact with the traffic data within either route provider 110 or traffic database 120. For example, an operator from a local transit authority or department of transportation may use computer 150 to enter information regarding the location of an accident. Route provider 110 may then use this information to determine the impact of the accident to roads within a predetermined distance of the accident. Route provider 110 may use this information when determining routes. For example, not only may route provider 110 measure the current status of congestion, it may also calculate the time it would take for the congestion to subside based on the influx of traffic into the congested area and based on the fact that some users have been notified of the event and are actively changing their route based on the information provided to them.

Transmission tower 160 may comprise any suitable combination of hardware, software and/or encoded logic operable to provide the wireless transmission or receipt of data and information. For example, transmission tower 160 may comprise a radio transmitter and receiver. Transmission tower 160 may provide wireless access to any of the components coupled to network 100. As may be apparent this may allow a mobile user to retrieve and/or update routing information as they travel. The ability to update routing information may provide a more accurate and up-to-date route.

As indicated above, these components may all be coupled to one another via network 100. Network 100 may comprise a collection of network components, such as routers, servers, nodes, gateways, gatekeepers, hubs, switches, session border controllers, and/or any other additional hardware, software, or embedded logic implementing any number of communication protocols that allow for the exchange of packets between network components and components connected to network 100. In the illustrated embodiment, network 100 is a wide area network (WAN) connecting several components used throughout a city. Network 100 may allow data and signaling to be passed between the various components depicted in FIG. 1. Accordingly, route provider 110 may be able to receive, from any of the components coupled to network 100, any information it may need to compute a route. Additionally, route provider 110 may be able to provide any components coupled to network 100 with this data or with a route determined by route provider 110. In other embodiments, network 100 may be distributed across multiple cities and geographic regions, and may be referred to as a metro area network (MAN). Network 100 may include one or more networks that may be referred to as local area networks (LAN).

Network 100 may be any network capable of transmitting audio and/or video communication signals, data, and/or messages, including signals, data or messages transmitted through text chat, instant messaging and e-mail. All, some, or none of network 100 may be implemented as a local area network (LAN), wide area network (WAN), global distributed network (e.g., the Internet), Intranet, Extranet, or any other form of wireless or wireline communication network. Generally, network 100 provides for the communication of packets, cells, frames, or other portions of information (generally referred to as packets herein) between the components that make up, and are connected to, network 100. IP networks transmit data by placing the data in packets and sending each packet individually to the selected destination, along one or more communication paths. In particular embodiments, network 100 may employ media communication protocols that allow for the addressing or identification of endpoints, nodes, and/or other network components coupled to network 100. For example, using Internet Protocol (IP), each of the components coupled together by network 100 may be identified in information directed using IP addresses. In this manner, network 100 may support any form and/or combination of point-to-point, multicast, unicast, or other techniques for exchanging media packets among components. Any network components capable of exchanging audio, video, or other data using frames or packets may be included in different embodiments.

Network 100 may be coupled to other IP networks, such as the Internet. Since IP networks share a common method of transmitting data, signals and/or data may be transmitted between components located on different, but interconnected, IP networks. In addition to being coupled to other IP networks, network 100 may also be coupled to non-IP networks through the use of interfaces and/or gateways. For example, transmission tower 160 may be coupled to network 100 through a gateway. This may allow traffic database 120 and/or route provider 110 to receive traffic data from additional components such as a mobile phone and/or any type of mobile navigation device.

In particular embodiments, one or more of the networks within, or coupled to, network 100 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of components, different embodiments may use any number or arrangement of such components for providing directions based on predicted traffic conditions. In addition, these components may include sub-components that may be centrally located (local) with respect to one another or distributed throughout network 100. Furthermore, two or more of these components may be combined into a single unit (e.g., route provider 110 and traffic database 120 may be a single component). Similarly, the functionality attributed to a particular component in the illustrated embodiment may be performed by a different component in a different embodiment.

Figure 2:
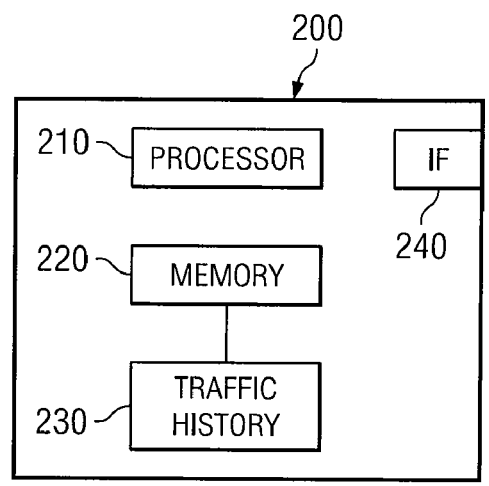
FIG. 2 is a block diagram illustrating some of the components of a route provider, in accordance with a particular embodiment.

FIG. 2 is a block diagram illustrating some of the components of a route provider, in accordance with a particular embodiment. Route provider 200 may be similar to, and provide similar functionality as, route provider 110 depicted in FIG. 1. Different embodiments may include all, some, or none of the components depicted in FIG. 2. Furthermore, route provider 200 may be a separate stand alone device or it may be incorporated into or a part of another device (e.g., computer 150a or guidance unit 130 depicted in FIG. 1). As depicted, route provider 200 includes processor 210, memory 220, traffic history database 230 (THDB 230), and interface 240.

Processor 210 may be a microprocessor, controller, or any other suitable computing device, resource, or combination of hardware, software and/or encoded logic operable to provide, either alone or in conjunction with other route provider 200 components (e.g., memory 220 and THDB 230) route provider functionality. Such functionality may include providing various features discussed herein to a user. One feature that certain embodiments may provide may include providing a user with directions for a route from one location to another that takes into account the predicted traffic along the route. A user may use any appropriate input device (e.g., computer 150 or guidance unit 130 depicted in FIG. 1) to enter, for example, a starting address and a destination address. Based on the information, data, instructions and rules stored within memory 220 and THDB 230 processor 210 may determine the quickest route between the starting address and the destination address. In determining the quickest route processor 210 may take into account the predicted traffic along the route based on the estimated time at which the user would be at a particular point along the route. For example, if the route includes driving on a particular freeway at a certain time, processor 210 may take into account the predicted traffic on that freeway at that time. More specifically, if the freeway is likely to be congested, processor 210 may attempt to avoid the freeway. Once a route has been determined it may be made available to others to help avoid congestion along the route. For example, the route may be sent via interface 240 to a traffic database (e.g., traffic database 120). The traffic database may store the route along with any other routes it may receive. These routes may be made available to route provider 110, and other route providers, so that processor 210 may be able to more accurately determine the predicted traffic of a particular area at a particular time.

Memory 220 may be any form of volatile or non-volatile memory including, without limitation, magnetic media, optical media, random access memory (RAM), read-only memory (ROM), removable media, or any other suitable local or remote memory component. Memory 220 may store any suitable data or information, including software and encoded logic, utilized by route planner 200. For example, memory 214 may maintain a listing, table, or other organization of information used in determining a route between two locations. As another example, memory 220 may store user profiles which may include various addresses entered by a user, such as their home address or their work address. As yet another example, memory 220 may also store information related to the cost of particular route segments. More specifically, in some embodiments, memory 220 may correlate the speed limit of a road with its cost, thus a freeway with a 65 MPH speed limit may have a lower associated cost than a side street with a 20 MPH speed limit. In particular embodiments, this cost may be adjusted by processor 210 to account for predicted traffic (e.g., if the traffic is expected to be heavy if the user was to take a particular road at a particular time, the cost of that road may be increased). In some embodiments, memory 220 may store one or more policies that may be used in determining a route between two places. These policies may, for example, effect whether distance or length of time is more important or what type of roads are preferred or to be avoided (e.g., freeways or toll roads). In particular embodiments, memory 220 may store previously determined routes. This may allow processor 210 to take into account the number of users it has sent along a particular route or route segment. For example, using a load balancing algorithm processor 210 may avoid sending too many users along the same route segment at the same time. The previously stored routes may also allow processor 210 to determine to which users an update may need to be sent. For example, if an accident occurs along, or within the vicinity of, the route provided for a user, route provider 200 may want to re-route the user to avoid those roads likely to be impacted by the accident.

THDB 230 may represent or use any appropriate combination of hardware, software and/or encoded logic either within route provider 200 or distributed throughout a network (e.g., traffic database 120 coupled to network 100 in FIG. 1). For example, THDB 230 may be any form of volatile or non-volatile memory including, without limitation, magnetic media, optical media, RAM, ROM, removable media, or any other suitable local or remote memory component. THDB 230 may store any suitable data or information utilized by route planner 200. For example, THDB 230 may maintain a listing, table, or other organization of information about traffic, such as location, timing, circumstances, severity, or any other information that may be desired. This information may be used by processor 210 in combination with, for example, a learning algorithm to determine or predict the traffic at a particular location at a later time. THDB 230 may be accessed, either directly or indirectly, by a user via any appropriate component coupled thereto (e.g., computer 150 or guidance unit 130 depicted in FIG. 1). For example, a user using a guidance unit to get directions may cause the guidance unit to request predicted traffic data from route provider 200. As another example, the user may use a computer to lookup the predicted traffic conditions of a particular road at a particular time. Depending on the embodiment and storage capacity of THDB 230, the contents of THDB 230 may be similar to, or a subset of, the data stored by traffic database 120 depicted in FIG. 1. Furthermore, in particular embodiments, matching database entries may exist in several different databases associated with different route providers.

Interface 240 may comprise any hardware, software, or encoded logic needed to be able to send and receive information between other components, such as traffic sensors, traffic databases, computers, guidance units or any other components that may provide or use traffic data and/or predicted traffic data. For example, route provider 200 may receive a message from a computer requesting directions between two addresses. The message may be received through interface 240 from a wire or wireless IP network. This may negate the need for dedicated wiring between the computer and route provider 200. Similarly, the response from route provider 200 may be sent to the computer via interface 240.

Figure 3A:
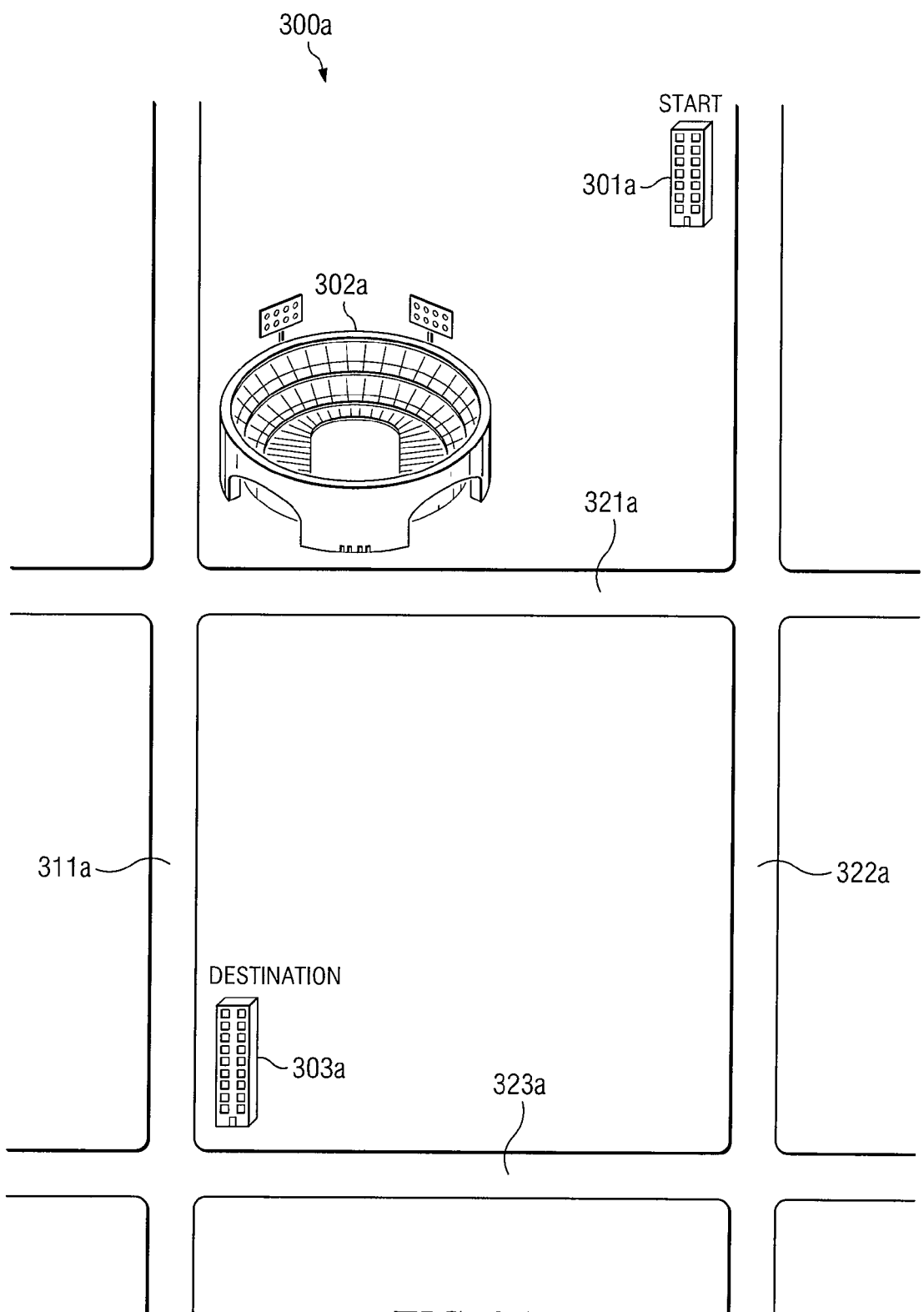
FIGS. 3A and 3B illustrate a sample mapping of a real world environment to a guidance unit operable to provide traffic predictive directions, in accordance with a particular embodiment.
Figure 3B:
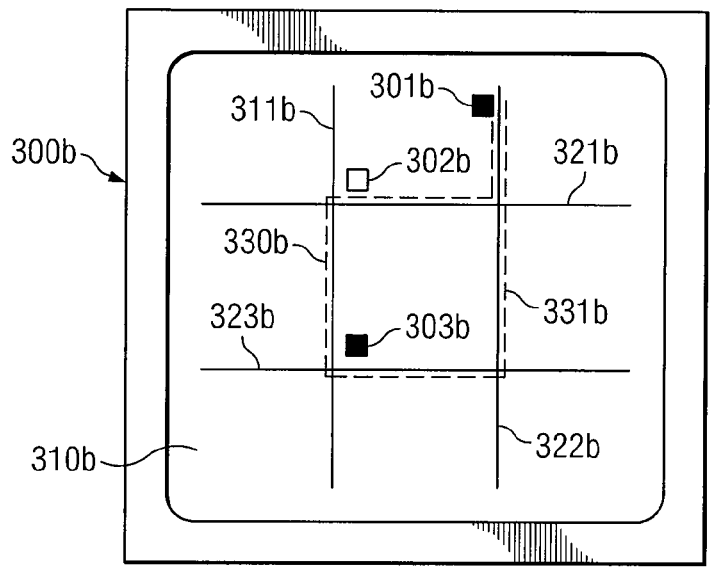

FIGS. 3A and 3B illustrate a sample mapping of a real world environment to a device operable to provide traffic predictive directions, in accordance with a particular embodiment. More specifically, the real world environment of city 300a is graphically represented in guidance unit 300b. Thus, city 300a's buildings 301a-303a, highway 311a, and streets 321a-323a are shown within display 310b of guidance unit 300b's as buildings 301b-303b, highway 311b, and streets 321a-323b. Except when making a distinction between a real world element and its graphical representation, reference may be made simply to buildings 301-303, highway 311, and streets 321-322. In addition to mapping the real world element of city 300a display 310b also displays routes 330b and 331b.

The following examples are presented to better appreciate some of the many features that may be encompassed in particular embodiments. As may be apparent, because of the variety and diversity of real world situations and scenarios, these examples are not intended to cover all possible scenarios. In each of these examples assume that a user wishes to travel from his office building, building 301, to the office building of his client, building 303.

For the first example, assume that there currently are not any traffic slowing incidents along any of streets 321-323 or highway 311 and that the user wants directions from building 301 to building 303 for a trip he plans on taking in the near future (e.g., he is already in his car and is not getting directions for a trip he going to take later in the afternoon or on a different day). His request for directions is sent to a route provider, such as route provider 200. The route provider may receive the request via an interface. Using traffic data that may have been received from a traffic history database, such as traffic database 120, the processor of the route provider may determine the quickest route from building 301 to building 303. This path is shown on display 310 as route 330. For later comparison it may be noted that route 330 passes by building 302, which is a sports arena, and then takes highway 311.

In the second example, assume that there is a game in building 302 that is schedule to end at 5:00 pm, which is just five minutes after the time that the user wishes to travel from building 301 to building 303. The route provider is aware of the game because it has stored within its memory a schedule of games and events to be held at building 302. Additionally, the route provider is able to consult a traffic history database to determine, using for example a learning algorithm, the extent of the traffic effect created by the end of the game. Thus, with this information the route provider may use its processor to generate a different route than in the first example. This alternate route may attempt to avoid the traffic from the game. More specifically, route 331b avoids street 321 passing in front of building 302 because the route provider has determined that the traffic will be very heavy at the time the user will be on street 321. It should be noted that because the user is leaving building 301 before the crowd at the game is expected to leave, there may not currently be any congestion near building 302 on street 321. Thus, the route provider is re-routing the user from path 330b based on the predicted increase in traffic from when the game ends and the time at which the user will be in the area of building 302.

A similar result may occur during rush hour. More specifically, upon receiving data from a traffic history database, the route provider may determine that highway 311 becomes congested beginning around 4:30 pm. Accordingly, at 4:20 pm, when the user requests directions from building 301 to building 303 the route provider may generate a route for the user that avoids highway 311 even though, at the time the route was calculated, there may not have been any congestion on highway 311. In some embodiments, the route provider may be aware of whether highway 311 includes a carpool lane, and whether the user is able to use the carpool lane. Based on this information the route provider may still use route 330b, but may advise the user to use the carpool lane because highway 311 is likely to be congested.

In the third example, assume that the route provider has generated route 330b for the user. Further assume that the user has started along route 330b, but after he has left building 301 and before he has reached street 321, an accident occurs on highway 311. The route provider may receive notice of the accident itself (e.g., an alert message indicating that there has been an accident on highway 311) or of an unexpected slow down in traffic along highway 311 (e.g., a traffic sensor detects a lower than normal traffic speed) which may be treated as an accident. The route provider may be able to determine the traffic consequences of the accident (e.g., which streets will become congested and how quickly they will back up). For example, the route provider's processor may determine that in the past, at this time of day, within five minutes of an accident on highway 311 the immediately preceding off-ramp becomes backed-up and within 8 minutes the congestion has spread to the next preceding off-ramp and nearby streets. Then, based on the determination of the traffic consequences, the route provider may decide to change the route from route 330b to 331b to avoid some of the congestion that is to occur from the accident. The updated route, route 331b, may be sent to the user's guidance unit via a transmission tower or satellite.

In the fourth example, assume that the route provider is aware of the routes being generated for several different users (e.g., the same route provider provided routes for several users or different route providers transmit their routes to each other). Each of these routes may be stored in the memory of the route provider or an external database accessible by the route provider. Further assume that several of these routes include having the user travel along street 321. Using, for example, a load balancing algorithm, the route provider's processor may determine that, while there may not currently be much traffic along street 321, once all the users who have routes that include street 321 arrive at street 321 the street will become congested. Accordingly, to help avoid contributing to the congestion, and to avoid delays, the route provider may generate route 331b instead of route 330b so as to avoid street 321.

While the examples discussed above used a route provider to determine the route from building 301 to 303, in some embodiments the route provider may simply supply the predicted traffic data. Thus, a guidance unit, for example, may determine the route from building 301 to building 303 by altering the cost associated with various roads by the level of predicted traffic supplied by the route provider. Furthermore, some embodiments may include routes or route segments that do not include a street, road, highway, freeway or other paved vehicular path (e.g., a route for a walker)

Figure 4:
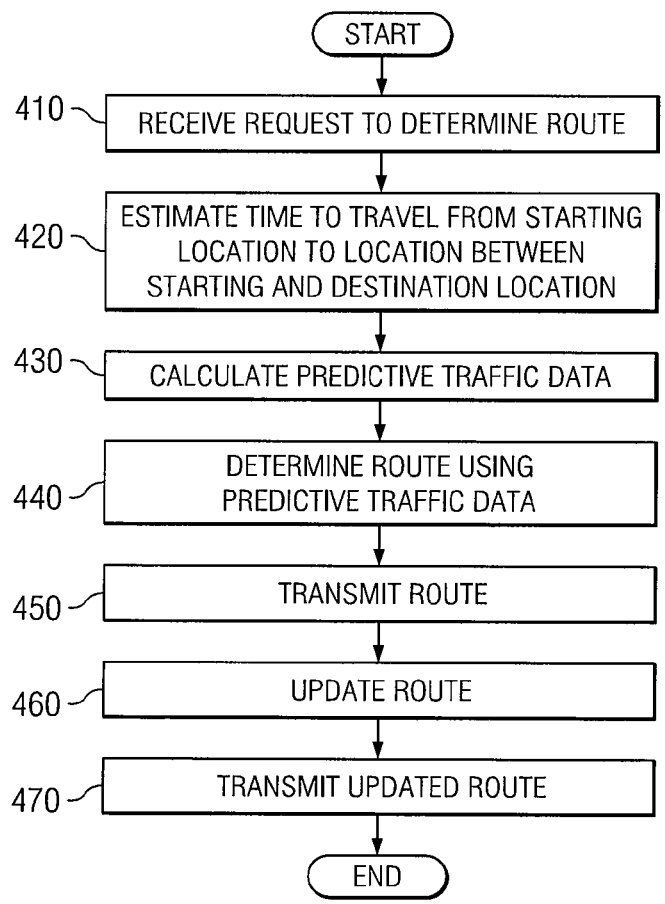
FIG. 4 illustrates a method for providing traffic predictive directions, in accordance with a particular embodiment.

FIG. 4 illustrates a method for providing traffic predictive directions, in accordance with a particular embodiment. The method begins at step 410 where a request to determine a route is received. Depending on the embodiment and scenario this may range from a request from a computer device (e.g., a personal computer) to a request from a user. For example, a user may enter a starting address or location and a destination address or location into his personal computer using a web-browser. A remote route provider (e.g., route provider 110 depicted in FIG. 1) that provides route guidance to users through the Internet may then receive the request from the user's personal computer. In some embodiments, the request may be received automatically. For example, assume a user uses a guidance unit installed in her car to provide a route to a remote destination. When the user returns to her car and turns it on the guidance unit may automatically request a route back to the user's home. For purposes of the remaining steps it will be assumed that the request for a route is received from a user at a portable guidance unit. More specifically, the user has requested his portable guidance unit provide him with a route from his current location to a destination location.

Once the portable guidance unit has received the request it may begin to determine the route between the user's current location and his destination. In doing so the portable guidance unit may repeatedly perform steps 420 and 430 in order to determine the predictive data that will be used at step 440 in determining the route. More specifically, at step 420, the portable guidance unit estimates the time it would take to travel from the user's starting location to a location between the user's starting location and destination; and at step 430 the portable guidance unit calculates the predictive traffic data for that intermediary location at that time. This intermediary location may be any type or size of location, such as an intersection, a portion of a road or highway, or a particular geographic area. This provides the portable guidance unit with predictive traffic data for various locations based on the time the user would be at that location if it were to be included in the determined route. Thus, at step 440, as the portable guidance unit is determining the route from the user's current location to his destination, it is able to take into account what it predicts the traffic will be when the user passes through the location as opposed to what the traffic conditions are currently.

In calculating the predictive traffic data the portable guidance unit may take into account a variety of different factors and information. For example, the portable guidance unit may take into account the time of day, the time of year, and the day of the week. The portable guidance unit may also take into account any scheduled events, such as sporting events, that may be starting or ending as the user passes by.

Once the route has been determined, at step 450 it is conveyed to the user via the portable guidance unit. In some instances the portable guidance unit may transmit the entire route at once. For example, the portable guidance unit may provide the user with an overview of the determined route (e.g., a map showing the starting and destination locations and highlighting the determined route) or a complete list of turn-by-turn directions. In particular instances the portable guidance unit may transmit the route over time. For example, the portable guidance unit may provide the user with a map view of the next 5 miles ahead of the user or with a voice prompt for the next upcoming turn. In particular embodiments, once the route is determined and accepted by a user, the route may be saved and used to update the predictive traffic (e.g., account for the additional traffic resulting from the user taking the provided route).

As may be apparent, because the portable guidance unit is using predicted traffic data to determine the route, it may become necessary to update the route as the user progresses along the route. For example, if an accident occurs along the route after the portable guidance unit determined the route then the traffic may be worse along the route than originally predicted. Accordingly, at step 460 the portable guidance unit updates the route, and then at step 470 the updated route is transmitted to the user through his portable guidance unit. This may allow the user to avoid the unexpectedly congested area. Steps 460 and 470 may be repeated as many times as may be necessary or desired. In some embodiments, if the user prints instructions for a specific route to be taken at a later time, the system may prompt the user to enter his mobile phone number. If the system detects changing traffic conditions which were not previously anticipated, the system may place a call or otherwise alert the user about the change and the resulting new proposed route.

Depending on the embodiment, the update of the route may be triggered by different actions. For example, some of the different actions that may trigger the portable guidance unit updating the route may include receiving a request from the user, receiving current traffic information from a traffic source (e.g., the local transit authority) indicating congestion on a portion of the route, or determining that the user's speed of travel is less than expected (e.g., the user is traveling more than 5 MPH less than the expected speed).

Some of the steps illustrated in FIG. 4 may be combined, modified or deleted where appropriate, and additional steps may also be added to the flowchart. Additionally, steps may be performed in any suitable order without departing from the scope of particular embodiments.

Numerous other changes, substitutions, variations, alterations and modifications may be ascertained by those skilled in the art and it is intended that various embodiments may encompass all, some or none of these changes, substitutions, variations, alterations and modifications. It is further intended that these changes, substitutions, variation, alteration and modifications fall within the spirit and scope of the appended claims.

What is claimed is:

1. A method, comprising:
   receiving a request to determine a route between a starting location and a destination location;
   determining a first route between the starting location and the destination location using predictive traffic data for at least one location between the starting location and the destination location;
   providing the first route in response to the request to determine a route between the starting location and the destination location;
   accessing updated predictive traffic data after a departure time for departure from the starting location, the updated predictive traffic data comprising data about an event occurring at an event time, the event affecting traffic for at least one location between the starting location and the destination location, the event time being after the departure time;
   determining a second route between an intermediate location and the destination location using the updated predictive traffic data; and
   providing the second route.

2. The method of claim 1, wherein:
   receiving a request to determine a route between a starting location and a destination location comprises receiving at a first time a request to determine a route between a starting location and a destination location; and
   determining a first route between the starting location and the destination location using predictive traffic data for at least one location between the starting location and the destination location comprises determining at a second time a first route between the starting location and the destination location using predictive traffic data based on a third time for one or more of the at least one location between the starting location and the destination location.

3. The method of claim 2, further comprising estimating the third time based on the second time and an estimated amount of time to travel from the starting location to the one or more of the at least one location between the starting location and the destination location.

4. The method of claim 1, further comprising updating the first route after the first route has been determined.

5. The method of claim 1, further comprising calculating the predictive traffic data from traffic data compiled prior to receiving the request to determine the route.

6. The method of claim 1, wherein determining a first route between the starting location and the destination location using predictive traffic data for at least one location between the starting location and the destination location comprises determining a first route between the starting location and the destination location using current traffic data and predictive traffic data for at least one location between the starting location and the destination location.

7. The method of claim 1, wherein determining a first route between the starting location and the destination location using predictive traffic data for at least one location between the starting location and the destination location comprises determining the first route between the starting location and the destination location using a load balancing algorithm and predictive traffic data for at least one location between the starting location and the destination location.

8. The method of claim 1, wherein the predictive traffic data comprises information indicative of at least one additional route other than the first route.

9. An apparatus, comprising:
   an interface operable to:
      receive a request to determine a route between a starting location and a destination location; and
   a processor coupled to the interface and operable to determine a first route between the starting location and the destination location using predictive traffic data for at least one location between the starting location and the destination location;
   wherein the interface is further operable to provide the first route in response to the request to determine a route between the starting location and the destination location;
   wherein the processor is further operable to:
      access updated predictive traffic data after a departure time for a departure from the starting location, the updated predictive traffic data comprising data about an event occurring at an event time, the event affecting traffic for at least one location between the starting location and the destination location, the event time being after the departure time; and
      determine a second route between an intermediate location and the destination location using the updated predictive traffic data; and
   wherein the interface is further operable to provide the second route.

10. The apparatus of claim 9, wherein:
    the interface operable to receive a request to determine a route between a starting location and a destination location comprises an interface operable to receive at a first time a request to determine a route between a starting location and a destination location; and
    the processor operable to determine a first route between the starting location and the destination location using predictive traffic data for at least one location between the starting location and the destination location comprises a processor operable to determine at a second time a first route between the starting location and the destination location using predictive traffic data based on a third time for one or more of the at least one location between the starting location and the destination location.

11. The apparatus of claim 10, wherein the processor is further operable to estimate the third time based on the second time and an estimated amount of time to travel from the starting location to the one or more of the at least one location between the starting location and the destination location.

12. The apparatus of claim 9, wherein the processor is further operable to update the first route after the first route has been determined.

13. The apparatus of claim 9, wherein the processor is further operable to calculate the predictive traffic data from traffic data compiled prior to receiving the request to determine the route.

14. The apparatus of claim 9, wherein the processor operable to determine a first route between the starting location and the destination location using predictive traffic data for at least one location between the starting location and the destination location comprises a processor operable to determine a first route between the starting location and the destination location using current traffic data and predictive traffic data for at least one location between the starting location and the destination location.

15. The apparatus of claim 9, wherein the processor operable to determine a first route between the starting location and the destination location using predictive traffic data for at least one location between the starting location and the destination location comprises a processor operable to determine the first route between the starting location and the destination location using a load balancing algorithm and predictive traffic data for at least one location between the starting location and the destination location.

16. The apparatus of claim 9, wherein the predictive traffic data comprises information indicative of at least one additional route other than the first route.

17. Logic encoded in one or more tangible media for execution and when executed operable to:
receive a request to determine a route between a starting location and a destination location;
determine a first route between the starting location and the destination location using predictive traffic data for at least one location between the starting location and the destination location;
provide the first route in response to the request to determine a route between the starting location and the destination location;
access updated predictive traffic data after a departure time for a departure from the starting location, the updated predictive traffic data comprising data about an event occurring at an event time, the event affecting traffic for at least one location between the starting location and the destination location, the event time being after the departure time;
determine a second route between an intermediate location and the destination location using the updated predictive traffic data; and
provide the second route.

18. The one or more tangible media of claim 17, wherein:
the logic operable to receive a request to determine a route between a starting location and a destination location comprises logic operable to receive at a first time a request to determine a route between a starting location and a destination location; and
the logic operable to determine a first route between the starting location and the destination location using predictive traffic data for at least one location between the starting location and the destination location comprises logic operable to determine at a second time a first route between the starting location and the destination location using predictive traffic data based on a third time one or more of the for at least one location between the starting location and the destination location.

19. The one or more tangible media of claim 18, further comprising logic operable to estimate the third time based on the second time and an estimated amount of time to travel from the starting location to the one or more of the at least one location between the starting location and the destination location.

20. The one or more tangible media of claim 17, further comprising logic operable to update the first route after the first route has been determined.

21. The one or more tangible media of claim 17, further comprising logic operable to calculate the predictive traffic data from traffic data compiled prior to receiving the request to determine the route.

22. The one or more tangible media of claim 17, wherein the logic operable to determine a first route between the starting location and the destination location using predictive traffic data for at least one location between the starting location and the destination location comprises logic operable to determine a first route between the starting location and the destination location using current traffic data and predictive traffic data for at least one location between the starting location and the destination location.

23. The one or more tangible media of claim 17, wherein the logic operable to determine a first route between the starting location and the destination location using predictive traffic data for at least one location between the starting location and the destination location comprises logic operable to determine the first route between the starting location and the destination location using a load balancing algorithm and predictive traffic data for at least one location between the starting location and the destination location.

24. The one or more tangible media of claim 17, wherein the predictive traffic data comprises information indicative of at least one additional route other than the first route.

25. An apparatus, comprising:
means for receiving a request to determine a route between a starting location and a destination location;
means for determining a first route between the starting location and the destination location using predictive traffic data for at least one location between the starting location and the destination location;
means for providing the first route in response to the request to determine a route between the starting location and the destination location;
means for accessing updated predictive data after a departure time for a departure from the starting location, the updated predictive traffic data comprising data about an event occurring at an event time, the event affecting traffic for at least one location between the starting location and the destination location, the event time being after the departure time;
means for determining a second route between an intermediate location and the destination location using the updated predictive traffic data; and
means for providing the second route.

26. The method of claim 1, further comprising, in response to determining the second route between an intermediate location and the destination location, communicating, using a phone number, the second route to a mobile device associated with the phone number.

* * * * *